United States Patent
Lippert et al.

(10) Patent No.: US 8,213,081 B2
(45) Date of Patent: Jul. 3, 2012

(54) OBJECTIVE REPLACEMENT DEVICE FOR MICROSCOPES

(75) Inventors: Helmut Lippert, Jena (DE); Benno Radt, Jena (DE); Christian Dietrich, Jena (DE); Christopher Power, Jena (DE)

(73) Assignee: Carl Zeiss MicroImaging GmbH, Jena (DE)

( * ) Notice: Subject to any disclaimer, the term of this patent is extended or adjusted under 35 U.S.C. 154(b) by 230 days.

(21) Appl. No.: 12/596,412

(22) PCT Filed: Apr. 4, 2008

(86) PCT No.: PCT/EP2008/002680
§ 371 (c)(1),
(2), (4) Date: Oct. 16, 2009

(87) PCT Pub. No.: WO2008/128630
PCT Pub. Date: Oct. 30, 2008

(65) Prior Publication Data
US 2010/0134881 A1 Jun. 3, 2010

(30) Foreign Application Priority Data
Apr. 18, 2007 (DE) .......................... 10 2007 018 862

(51) Int. Cl.
*G02B 21/02* (2006.01)
(52) U.S. Cl. ...................................................... 359/398
(58) Field of Classification Search .................. 359/381, 359/398, 821
See application file for complete search history.

(56) References Cited

U.S. PATENT DOCUMENTS

| 4,563,883 | A |   | 1/1986  | Sitte |
| 5,363,190 | A | * | 11/1994 | Inaba et al. ............... 356/337 |
| 5,422,718 | A |   | 6/1995  | Anderson |
| 5,576,897 | A | * | 11/1996 | Kuo .......................... 359/822 |
| 5,680,484 | A |   | 10/1997 | Kikuchi et al. |
| 5,710,625 | A |   | 1/1998  | Neumann et al. |
| 5,818,637 | A |   | 10/1998 | Hoover et al. |
| 5,870,223 | A | * | 2/1999  | Tomimatsu ................ 359/392 |

(Continued)

FOREIGN PATENT DOCUMENTS
DE     102 57 423 A1    6/2004
(Continued)

OTHER PUBLICATIONS

Voie, Arne H.;"Imaging the intact guinea pig tympanic bulla by orthogonal-plane fluorescence optical sectioning microscopy";Hearing Res.,Elsevier Science Pub. 2002;171:119-128.

*Primary Examiner* — Mark Consilvio
(74) *Attorney, Agent, or Firm* — Duane Morris LLP

(57) ABSTRACT

The invention relates to an objective replacement device for a microscope, wherein the sample is located in a sample chamber and surrounded by an immersion medium within the sample chamber, means for positioning and aligning the sample relative to the focus of an objective being present, wherein the detection beam path is aligned horizontally, which is to say perpendicular to the direction of action of gravity. For an objective replacement device for a microscope of the type described above, according to the invention a device is provided for exchanging the objective, at the focus of which the sample is positioned and aligned, with at least another objective, the position and alignment of the sample within the sample chamber remaining the same.

13 Claims, 2 Drawing Sheets

U.S. PATENT DOCUMENTS

| | | | |
|---|---|---|---|
| 6,359,731 B1* | 3/2002 | Koyama | 359/381 |
| 7,227,630 B1* | 6/2007 | Zavislan et al. | 356/244 |
| 7,327,514 B2* | 2/2008 | Uhl et al. | 359/381 |
| 2006/0072190 A1* | 4/2006 | Okugawa | 359/368 |
| 2006/0141613 A1* | 6/2006 | Tsuchiya et al. | 435/288.7 |
| 2006/0238885 A1* | 10/2006 | Hasegawa et al. | 359/657 |
| 2008/0170292 A1* | 7/2008 | Harada et al. | 359/391 |
| 2008/0304145 A1* | 12/2008 | Hasegawa | 359/383 |
| 2010/0067104 A1* | 3/2010 | Lippert et al. | 359/391 |
| 2010/0177381 A1* | 7/2010 | Lippert et al. | 359/398 |

FOREIGN PATENT DOCUMENTS

| | | |
|---|---|---|
| DE | 11 2004 000 341 T5 | 4/2006 |
| JP | 2003 177331 A | 6/2003 |
| WO | WO 02/095476 A2 | 11/2002 |
| WO | WO 02/095476 A3 | 11/2002 |
| WO | WO 2007/065711 A1 | 6/2007 |

* cited by examiner

OBJECTIVE REPLACEMENT DEVICE FOR MICROSCOPES

RELATED APPLICATIONS

The present application is a U.S. National Stage application of International PCT Application No. PCT/EP2008/002680 filed on Apr. 4, 2008 which claims priority benefit of German Application No. DE 10 2007 018 862.7 filed on Apr. 18, 2007, the contents of each are incorporated by reference in their entirety.

FIELD OF THE INVENTION

The present invention relates to an objective replacement device for a microscope in which the specimen is positioned in a specimen chamber and is surrounded by an immersion medium inside the specimen chamber, and in which means are provided for positioning and orienting the specimen relative to the focus of a lens, with the detection beam path being oriented horizontally, i.e., perpendicular to the direction of action of the gravitational force.

BACKGROUND OF THE INVENTION

The objective replacement device according to the present invention is especially useful when used with single plane or selective plane illumination microscopy (SPIM). While confocal laser scanning microscopy is used to scan the specimen point-by-point in a plurality of planes at different depths from which three-dimensional image data of the specimen are subsequently obtained, SPIM technology is based on wide-field microscopy and allows the three-dimensional imaging of the specimen based on optical slices through different planes of the specimen.

The advantages of SPIM technology are, inter alia, the higher speed at which the images are captured, reduced bleaching especially of biological specimens, and a greater depth of penetration of the focus into the specimen.

In SPIM technology, fluorophores that are contained in the specimen or have been introduced into the specimen are, as a rule, excited with laser light which is formed into a so-called "light sheet" or, rather, which is passed across the specimen in such a manner that effectively (in the course of the observation period) the form of a light sheet results. Using one light sheet at a time, a plane at a certain depth of the specimen is illuminated, and by means of this illumination, an image of the specimen in this particular plane is obtained.

PRIOR ART

SPIM technology has been described, for example, by Stelzer et al., Optics Letters 31, p. 1477 (2006), by Stelzer et al., Science 305, p. 1007 (2004), in DE 102 57 423 A1, and in WO 2004/0530558 A1.

These publications disclose, inter alia, a specimen holder which allows an orientation of the specimen optimum for obtaining three-dimensional image data from different viewing directions. To this end, the specimen is embedded in a gel that is formed into a circular cylinder, and this gel cylinder is placed into a specimen chamber that is filled with an immersion medium, for example, water. It is important that the refractive index of the gel not differ greatly from the refractive index of the surrounding immersion medium.

The gel cylinder that encloses the specimen is positioned in the specimen chamber in such that its axis of rotation extends in the direction of the gravitational force, which, considering the deformability of the gel, has advantages when it comes to positioning the specimen. This gel cylinder is positioned so that, for image capture, it can be subjected to a translatory movement inside the specimen chamber and, optionally, it can also be rotated about its axis of rotation.

The optical axis of the lens that collects the detection light coming from the specimen (in the present invention, this lens will hereinafter also be referred to as detection lens) is oriented approximately perpendicular to the axis of rotation of the gel cylinder and therefore does not extend vertically—as it does in the conventional microscope configuration—but horizontally, i.e., perpendicular to the direction of the gravitational force.

For images that are to be captured with high linear magnification and a large numerical aperture, it is customary to use detection lenses designed as immersion lenses. The immersion lenses project through a wall of the specimen chamber into the specimen chamber and, to prevent leakage of the immersion medium at the point of the lead-through through the wall, are sealed along their outer periphery against the wall of the specimen chamber.

A problem not yet satisfactorily solved in the prior art is how to change immersion lenses so as to be able to view a specimen, the position and orientation of which remains unchanged during the lens change, at different linear magnifications or different resolutions.

OBJECTS OF THE INVENTION

Thus, using this prior art as a starting point, the problem to be solved by the invention is to make available a objective replacement device which allows immersion lenses to be changed easily and within the shortest possible time while the position and orientation of the specimen remains unchanged.

SUMMARY OF THE INVENTION

According to the present invention, the objective replacement device for a microscope of the type described above comprises a system for exchanging the lens, in the focus of which the specimen is positioned and oriented, for at least one other lens while the position and orientation of the specimen in the specimen chamber filled with the immersion medium remains the same.

In a first embodiment of the objective replacement device according to the present invention, a plurality of lenses project through a wall of the specimen chamber, whereby the lens-side ends of the lenses are positioned inside the specimen chamber and the image-side are being positioned outside the specimen chamber, and the lenses in the area of the lead-through through the wall of the specimen chamber are connected to the wall of the specimen in a manner that provides a hermetic seal against the immersion medium, and the wall of the specimen chamber is movably mounted in a guide, which is also hermetically sealed against the immersion medium, and, by means of this guide, can be moved together with the lenses relative to the other walls of the specimen chamber so that, by moving the wall of the specimen chamber, a selected lens can be positioned in the detection beam path.

Of advantage is a linear motion guide in which the lenses are disposed one after the other, in the direction of movement, with their optical axes oriented parallel to one another.

Depending on the embodiments, the direction of movement can alternatively be horizontally or vertically oriented.

In a second embodiment of the objective replacement device according to the present invention, the lens selected for placement in the detection beam path projects through the side wall of a lens-holding chamber that is filled with the same immersion medium, with the lens-side end of the lens positioned inside the lens-holding chamber and with the image-side end positioned outside the lens-holding chamber, and with the outer periphery of the lens, in the area of the lead-through through the side wall, connected to the side wall in a manner to provide a hermetic seal against the immersion medium, and means for connecting the lens-holding chamber with the specimen chamber are provided so that inside the two connected chambers, the lens is positioned in the detection beam path and the detection light coming from the specimen reaches the lens by passing exclusively through the immersion medium.

This is accomplished by providing the two chambers with openings through which the detection beam path coming from the specimen is directed at the lens when the two chambers are connected to each other. These openings are surrounded by gaskets that are impermeable to the immersion medium.

In a special embodiment, the specimen can be moved into the area of the lens-holding chamber or the lens can be moved into the area of the specimen chamber.

In addition, the specimen chamber, preferably also the lens chamber, comprises a mechanism for closing the opening. When both openings are closed, the two chambers can be disconnected, and the lens-holding chamber can be removed from the specimen chamber. In its place, a lens-holding chamber can now be connected to the specimen chamber, which lens-holding chamber has a lens, the optical properties of which differ from those of the lens in the first lens-holding chamber. The lens-holding chamber, however, is not necessarily dedicated to a particular lens, i.e., one and the same lens-holding chamber can be used for different lenses.

Specifically, the opening in the lens-holding chamber can be a removable side wall, and the opening in the specimen chamber can also be a removable side wall, which, to distinguish it from the former side wall, will be referred to as specimen chamber wall. The removable walls can preferably be moved in linear motion guides that have appropriate gaskets.

Another possibility is for the openings to be disposed in only one area of the side wall of the lens-holding chamber and in only one area of the specimen chamber wall.

It is also within the scope of the invention to configure the specimen chamber and the lens-holding chamber as a single compact module, for example, in the form of a combined specimen and lens-holding chamber in which a separating wall that is impermeable to the immersion medium can be installed so that the installed separating wall effectively creates two chambers, i.e., the specimen chamber, on the one hand, and the lens-holding chamber, on the other hand.

In this particular embodiment, the lens-holding chamber and the specimen chamber cannot be separated from each other; however, to change the lens, the separating wall is installed so that the specimen remains in the immersion medium while the lens-holding chamber is emptied or vice versa.

In a third embodiment of the objective replacement device according to the present invention, a specimen chamber wall is made of a transparent material, and means are provided for positioning the lens-side first optically active surface of the lens on the outer surface of this specimen chamber wall, which surface faces away from the immersion medium, whereby after positioning, the detection light coming from the specimen reaches the lens after exclusively passing through the gel, the immersion medium, the transparent specimen chamber wall and the first optically active surface.

In this case, it is of special advantage if the specimen chamber wall is made of an elastic transparent material so that the lens that has been placed on this specimen chamber wall can be moved along the detection beam path, either toward the specimen or away from the specimen, and so that during this movement, contact between the first optically active surface and the specimen chamber wall is maintained.

With this movement, it is easily possible to vary the position of the focus in the specimen. Another advantage is that the lens can be easily removed from the specimen chamber wall and be replaced with a different lens having different optical properties, while the position and the orientation of the specimen remain unchanged. In addition, in the embodiment of the objective replacement device according to the present invention, both dry lenses and immersion lenses can be used.

The transparent and also elastic specimen chamber wall can, for example, be made of Teflon materials, such as "cytop" manufactured by "Asahi glass" or fluoroethylene propylene "FEP" manufactured by "DuPont," with a suitable refractive index, for example, that of water.

It is conceivable and within the scope of the invention to insert a small hole in the elastic specimen chamber wall in the area of the axis of detection, through which hole the detection light is transmitted. The hole must be small enough that during the lens change, any leaking from the specimen chamber is prevented by the surface tension of the inversion [sic; immersion] medium and/or the reduced outflow time.

It is also conceivable for the specimen chamber wall to be made, for example, of glass with a specific refractive index and/or a specific surface curvature so that said specimen chamber wall, in combination with the lenses used, functions as an optical element in the detection beam path. The connection to the lenses can be direct or indirect by means of a second immersion medium (air, water).

The above-described embodiments of the objective replacement device according to the present invention make it possible to easily and quickly change especially immersion lenses while the orientation of the specimen remains unchanged.

For example, for viewing the specimen, at least two lenses with different resolution parameters can be used so that, first, general overview images of the specimen are captured with a low-resolution lens, and after changing the lens, higher-resolution images of selected regions of the specimen are captured.

The immersion medium preferably used is water.

BRIEF DESCRIPTION OF THE DRAWINGS

The invention will be explained in greater detail below with reference to practical examples. In the appended drawings.

DESCRIPTION OF THE EMBODIMENTS

Figure 1:
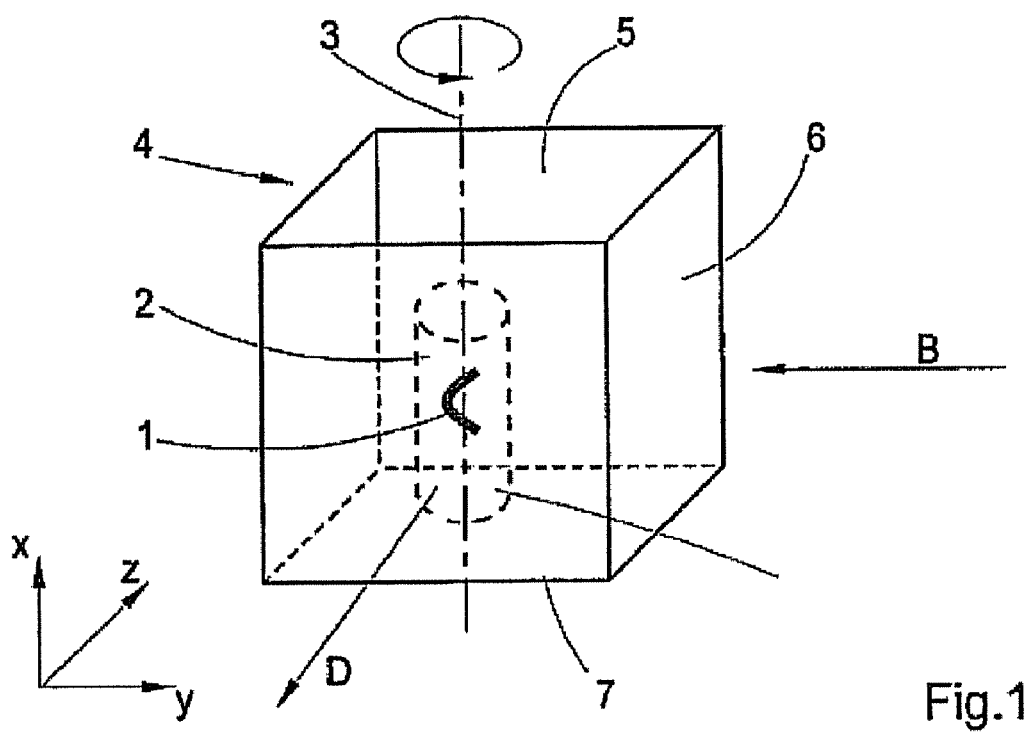
FIG. 1 is a diagrammatic representation of the principle of single-plane or selective-plane illumination microscopy (SPIM)

FIG. 1 illustrates the basic principle of single-plane illumination microscopy (SPIM). As FIG. 1 shows, a specimen 1 is embedded into a gel that has been formed into a circular cylinder 2. Let us assume that specimen 1 is a three-dimensional object, for example, a biological substance. Let us further assume that the gel is agarose.

The axis of rotation 3 of the circular cylinder 2 is oriented in the vertical direction, i.e., in the direction of action of the gravitational force. The circular cylinder 2 that encloses specimen 1 is located in a specimen chamber 4 which is filled with an immersion medium, for example, water. The specimen chamber 4 is open on the top side 5, by means of which not only specimen 1 that is surrounded by the gel, but also the immersion fluid, can be placed into the chamber.

Inside the specimen chamber 4, the circular cylinder 2, including specimen 1, can be subjected to a translatory movement in the coordinate directions X, Y, Z and is mounted so as to be able to rotate about the axis of rotation 3.

To illuminate the specimen, a laser beam source is included (not shown in the drawing), which emits a light bundle with a wavelength of, for example, 488 nm. The intensity of radiation in the cross section of this light bundle is homogenized by means of suitable optical means, and the light bundle, in its further path, is formed into a so-called "light sheet" by means of an optical system, for example, anamorphic focusing. An effective light sheet can also be generated by a scanning beam.

The optical means for homogenizing and forming the light sheet are not the object of the present invention and need not be explained in detail. Furthermore, an explanation is unnecessary since the technical means required for forming a light sheet can be found in the prior art cited in the introduction to the description.

In the horizontally extending direction designated by arrow B, the illuminating light that has been formed into a light sheet passes through the specimen chamber wall 6, through the immersion medium contained in the specimen chamber 4 and through the gel forming the circular cylinder 2, and is directed at specimen 1 and thus, depending on the thickness of the light sheet, illuminates a certain plane of specimen 1.

A portion of the illuminating light that is reflected or inelastically scattered by the specimen emerges as detection light from the specimen chamber 4 through the specimen chamber wall 7 in the direction designated by arrow D and is collected by a lens (not shown in the drawing). This lens is part of the microscope with which images of the illuminated plane of specimen 1 are captured and displayed in a visually perceptible manner.

By subjecting specimen 1 to a translatory movement in the coordinate directions X, Y or Z and/or by rotating the circular cylinder 2 about the axis of rotation 3 relative to the light sheet, it is possible to illuminate, microscopically capture and subsequently analyze different planes of specimen 1.

The lens used can be either a dry lens or, preferably, an immersion lens, which immersion lens projects through the specimen chamber wall 7, with the lens-side end of the lens positioned inside the specimen chamber 4 and with the image-side end positioned outside the specimen chamber 4.

To prevent leakage of the immersion liquid through the specimen chamber wall 7 at the point at which the lens projects through the wall, the outer periphery of the lens, is hermetically sealed to the specimen chamber wall 7 against the immersion liquid.

As already discussed above, it is desirable to be able to view one and the same specimen with different lenses that can be exchanged one for the other, for example, with lenses that differ as to the obtainable linear magnification, the numerical aperture or the resolution so as to be able to obtain images with different information content.

Figure 2:
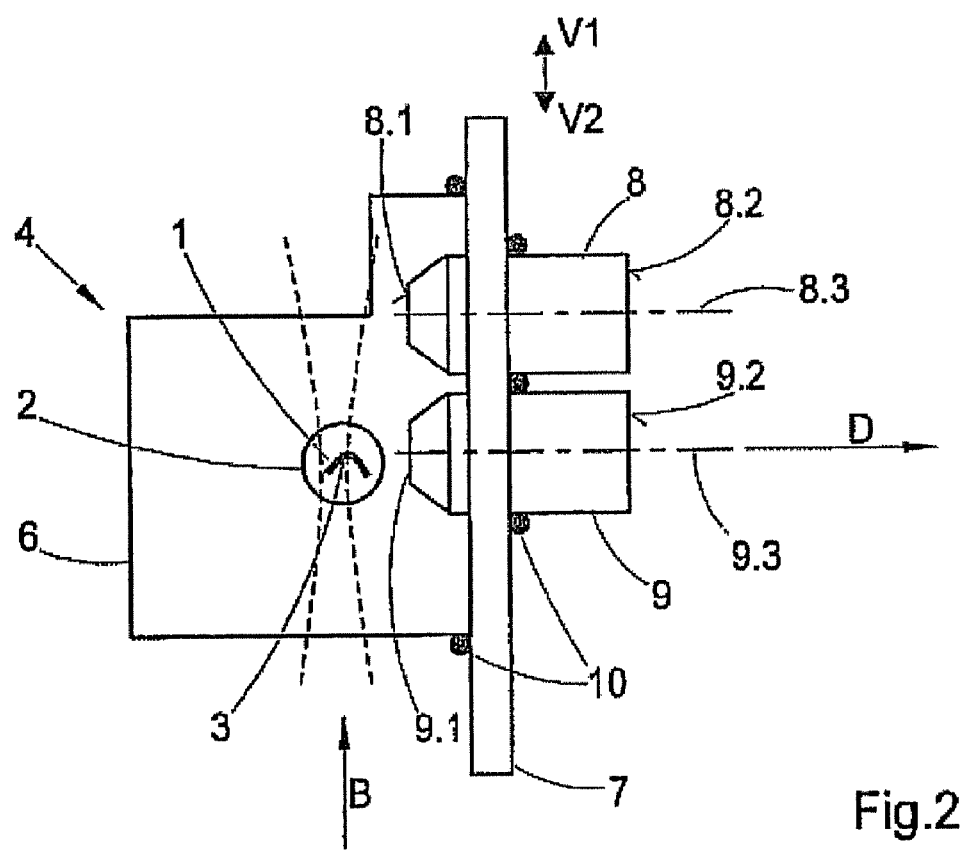
FIG. 2 is a diagrammatic illustration of a first practical example in which a plurality of lenses project through a specimen chamber wall.

To be able to change immersion lenses easily, within the shortest possible time and while keeping the position and orientation of the specimen unchanged, a first practical example of the configuration according to the present invention shown in FIG. 2 proposes to project a plurality of lenses, for example, lens 8 and lens 9, through the specimen chamber wall 7 of the specimen chamber 4.

For the sake of clarity, this figure shows a top view of the specimen chamber 4 rather than the perspective view seen in FIG. 1. In this top view, the axis of rotation 3 is perpendicular to the plane of the drawing. The directions of arrows B and D are orthogonal to each other and oriented relative to the axis of rotation 3, as can also be seen in FIG. 1.

The lens-side ends 8.1. and 9.1, respectively, of lenses 8 and 9 are located inside the specimen chamber 4, the image-side ends 8.2 and 9.2 are located outside the specimen chamber 4. The optical axes 8.3 and 9.3 of lenses 8 and 9 are oriented parallel to each other.

The specimen chamber wall 7 is mounted in a linear motion guide (not shown) so as to be movable into the directions designated by arrows V1 and V2. It will be assumed that the range of movement is limited by two endpoints, with lens 9, with its optical axis 9.3 being oriented to specimen 1, being located in the first endpoint, i.e., in the endpoint shown in FIG. 2, and that after moving the specimen chamber wall 7 in direction V2, the second endpoint is reached in which the optical axis 8.3 of lens 8 is subsequently oriented to specimen 1.

In this manner, the specimen chamber wall 7, including lenses 8 and 9, is movably mounted relative to the other components of the specimen chamber 4 as well as relative to the circular cylinder 2 that holds specimen 1. To avoid leakage of the immersion liquid, gaskets 10 are disposed along the positions at which lenses 8 and 9 project through the specimen chamber wall 7 as well as along the connecting points between the specimen chamber wall 7 and the other specimen chamber walls.

Thus, it is possible to alternatively place lens 8 or lens 9 into the detection beam path so as to obtain, in accordance with the optical properties of lenses 8 and 9, images with the desired resolution or the desired linear magnification.

The light sheet used for this purpose is symbolically represented and designated by reference symbol 20.

Figure 3:
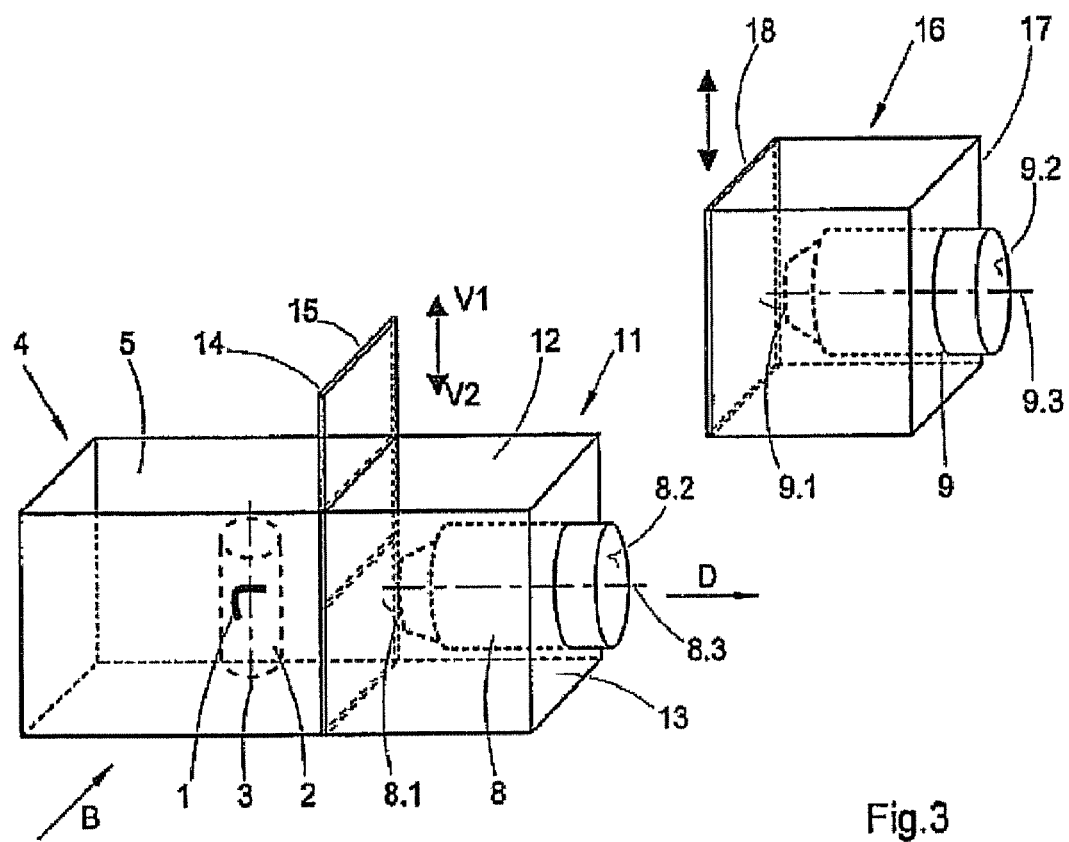
FIG. 3 is a diagrammatic illustration of a second practical example in which the selected lens that is to be placed into the detection beam path projects through the side wall of a lens-holding chamber.

FIG. 3 shows a second practical example of the objective replacement device according to the present invention. For reasons of clarity, identical modules or components will be designated with the same reference symbols used to explain FIG. 1 and FIG. 2.

As FIG. 3 shows, a lens-holding chamber 11 is located next to the specimen chamber 4. The lens-holding chamber 11 is filled with an immersion medium identical to that contained in the specimen chamber 4. To be able to fill immersion medium into the lens-holding chamber 11, this chamber is open on the top side 12.

Lens 8 projects through a side wall 13 of the lens-holding chamber 11, with its lens-side end 8.1 being positioned inside the lens-holding chamber 11 and with its image-side end 8.2 being positioned outside the lens-holding chamber 11.

A specimen chamber wall 14 of the specimen chamber 4, which is equivalent to the specimen chamber wall 7 in FIG. 1 and FIG. 2, and a side wall 15 of the lens-holding chamber 11 can be moved by means of a linear motion guide into the directions V1 and V2.

The specimen chamber 4 and the lens-holding chamber 11 are connected to each other in a manner such that the specimen chamber wall 14 and the side wall 15 are opposite and parallel to each other, with gaskets (not shown) being disposed along the peripheries of the specimen chamber wall 14 and the side wall 15, which gaskets hermetically seal the specimen chamber 4 and the lens-holding chamber 11 against the immersion liquid. The connection can be implemented, for example, under initial stress by means of manually detachable spring clips (not shown).

When the specimen chamber 4 and the lens-holding chamber 11 are positioned opposite each other in the position shown in FIG. 3 and when they are connected by means of spring clips in such a manner that they are hermetically sealed against the immersion liquid, the specimen chamber wall 14 and the side wall 15 are pulled upward in direction V1 until the path for the detection light coming from the specimen 1 and passing through the gel and the immersion liquid up to the lens 8 is free.

Thus, specimen 1 can be viewed with lens 8 using SPIM technology. As in the embodiment according to FIG. 2, the circular cylinder 2 is again supported in such a manner that it can be subjected to a translatory movement in the coordinate directions X, Y and Z and that it can rotate about the axis of rotation 3. As in FIG. 2, arrows B and D again designate the directions of the illuminating beam and the detection beam path.

When specimen 1 is to be observed through a lens 9 having optical properties different from those of lens 8, the specimen chamber wall 14 and the side wall 15 are pushed downward in direction V2 until the specimen chamber 4 is sealed off by means of the specimen chamber wall 14, and the lens-holding chamber 11 is sealed off against the immersion liquid by means of the side wall 15.

Subsequently the spring clips are loosened, and the lens-holding chamber 11 is detached from the specimen chamber 4. Its place is subsequently taken by a lens-holding chamber 16 which has the essential design features of the lens-holding chamber 11; i.e., lens 9 similarly projects through a side wall 17, the lens-holding chamber 16 is filled with the same immersion liquid as that contained in the specimen chamber 4, and it has a side wall 18 which, like the side wall 15 of the lens-holding chamber 11, can be moved in directions V1 and V2.

With respect to the spring clips, the lens-holding chamber 16 is also compatible with the lens-holding chamber 11, and in its place, the lens-holding chamber 11 is now connected to the specimen chamber 4 so that the optical axis 9.3 of lens 9 is oriented to specimen 1. Specimen 1 can now be viewed, for example, with a changed resolution or a changed linear magnification.

Figure 4:
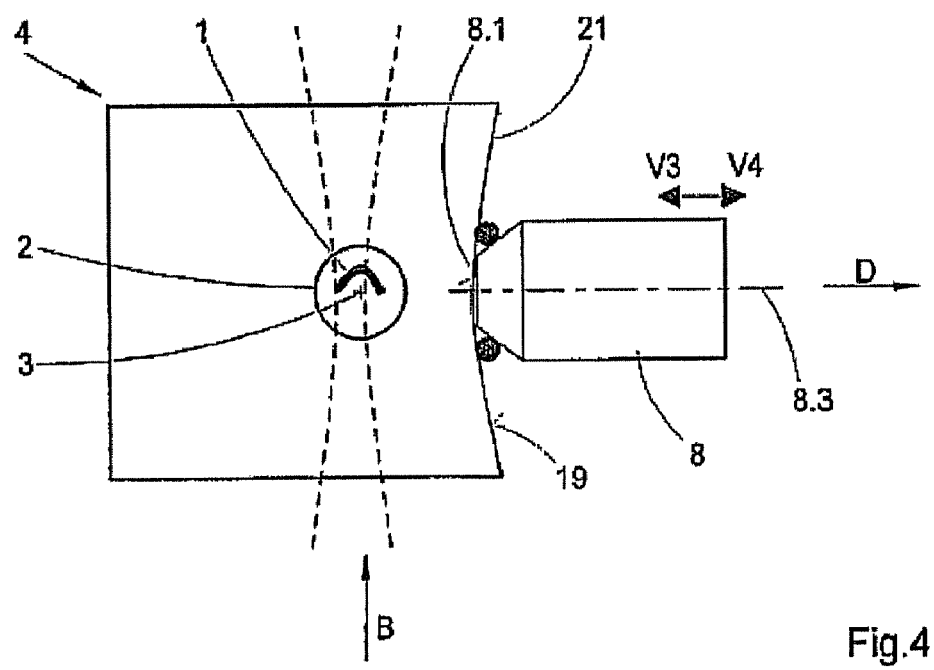
FIG. 4 is a diagrammatic illustration of a third practical example in which a wall of a specimen chamber is made of a transparent material.

A third practical example of the objective replacement device according to the present invention is shown in FIG. 4. This figure shows a top view of the specimen chamber 4, with the axis of rotation 3 being perpendicular to the plane of the drawing. In this case, a specimen chamber wall 21 is made of a transparent and also elastic material, for example, Teflon. Lens 8 is positioned with its lens-side end 8.1 outside the specimen chamber 4 on outer surface 19 of the specimen chamber wall 21, which outer surface faces away from the immersion medium, and the optical axis 8.3 is oriented to specimen 1.

As indicated by arrows V3 and V4, lens 8 is mounted so as to be movable in these directions, thereby making it possible to vary the position of the focus in specimen 1 simply by moving the lens.

As in the embodiments according to FIG. 2 and FIG. 3, specimen 1 can also be subjected to a translatory movement into the coordinate directions X, Y and Z and is mounted so as to be rotatable about the axis of rotation 3, thereby allowing different planes of specimen 1 to be detected.

If specimen 1 is to be viewed with a different lens, the optical properties of which differ from the optical properties of lens 8, lens 8 is easily and readily removed from the position shown, and a lens with the desired optical properties is inserted in its place.

In this embodiment of the objective replacement device according to the present invention, both dry lenses and immersion lenses can be used to advantage for viewing the specimen.

LIST OF REFERENCE SYMBOLS

1 Specimen
2 Circular cylinder
3 Axis of rotation
4 Specimen chamber
5 Top side
6, 7 Specimen chamber wall
8, 9 Lens
8.1, 9.1 Lens-side end
8.2, 9.2 Image-side end
8.3, 9.3 Optical axis
10 Gaskets
11 Lens chamber
12 Top side
13, 14, 15 Specimen chamber wall
16 Lens chamber
17, 18, 19 Specimen chamber wall
20 Light sheet
B, D Direction
V1, V2, V3, V4 Direction While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. An objective replacement device for a microscope, comprising:
    a specimen chamber having a specimen located therein surrounded by an immersion medium inside the specimen chamber,
    said specimen being arranged so as to be positioned and oriented relative to a lens focus, light from said specimen creating a detection beam, the detection beam path being parallel to an optical axis of an objective lens, said path being perpendicular to gravity, a system for exchanging said lens for at least one other selected lens while keeping the specimen within the specimen chamber that is filled with the immersion medium in an unchanged position and orientation, and wherein a plurality of lenses project through a wall of said specimen chamber, whereby lens side ends of said plurality of lenses are positioned inside the specimen chamber, and image-side ends are positioned outside the specimen chamber, and said plurality of lenses, in an area of lead-through through the specimen chamber wall, are connected to the specimen chamber wall so as to provide a hermetic seal against said immersion medium, and said specimen chamber wall being movably mounted in a guide, which is hermetically sealed against the immersion medium, and which is moveable by said guide together with the plurality of lenses relative to other walls of said specimen chamber so that, by moving the specimen chamber wall, a selected lens of said plurality is positioned in the detection beam path.

2. The objective replacement device of claim 1, wherein said guide is a linear motion guide and the plurality of lenses are disposed one after the other in a direction of movement with optical axes that are oriented parallel to each other.

3. The objective replacement device of claim 2 in which said direction of movement is oriented vertically.

4. An objective replacement device for a microscope, comprising:

a specimen chamber having a specimen located therein surrounded by an immersion medium inside the specimen chamber, said specimen being arranged so as to be positioned and oriented relative to a lens focus, light from said specimen creating a detection beam, the detection beam path being parallel to an optical axis of an objective lens said path being perpendicular to gravity, a system for exchanging said lens for at least one other selected lens while keeping the specimen within the specimen chamber that is filled with the immersion medium in an unchanged position and orientation, and wherein said selected lens to be placed into the detection beam path projects through a side wall of a lens-holding chamber that is filled with the same immersion medium as in said specimen chamber, whereby a lens-side end of said selected lens is positioned inside said lens-holding chamber and an image-side end of said selected lens is positioned outside said lens-holding chamber, said selected lens having an outer periphery, said outer periphery in the area of lead-through through said side wall, being connected to the side wall so as to provide a hermetic seal, said lens-holding chamber being connected with the specimen chamber, so that the selected lens inside the connected chambers is positioned in the detection beam path, said detection light coming from the specimen thereby reaching said selected lens by passing exclusively through the gel and the immersion medium.

5. The objective replacement device of claim 4, wherein a gasket impermeable to said immersion medium is disposed between a specimen chamber wall of the specimen chamber and a side wall of the lens-holding chamber, which side wall extends parallel to the specimen chamber wall, and in that both the specimen chamber wall and the side wall can be removed from the detection beam path.

6. The objective replacement device of claim 5, wherein said removable specimen chamber wall and said removable side wall are mounted in linear motion guides and can be moved within said linear motion guides at least to such an extent that the path for detection light coming from the specimen and passing through the immersion medium to the selected lens is free.

7. The objective replacement device of claim 4, wherein a plurality of lens-holding chambers are provided, which are compatible with one another with respect to the connection with the specimen chamber, with the lens-holding chambers, however, having a plurality of lenses, each of which has different optical properties.

8. An objective replacement device for a microscope, comprising:

a specimen chamber having a specimen located therein surrounded by an immersion medium inside the specimen chamber, said specimen being arranged so as to be positioned and oriented relative to a lens focus, light from said specimen creating a detection beam, the detection beam path being parallel to an optical axis of an objective lens, said path being perpendicular to gravity, a system for exchanging said lens for at least one other selected lens while keeping the specimen within the specimen chamber that is filled with the immersion medium in an unchanged position and orientation, and wherein said selected lens to be placed into the detection beam path projects through a side wall of a combined specimen and lens-holding chamber that is filled with an immersion medium, whereby a lens-side end of said selected lens is positioned within the specimen and lens-holding chamber and its image-side end is positioned outside the lens-holding chamber, said selected lens having an outer periphery, said outer periphery being connected to said side wall in the area of lead-through through the side wall so as to provide a hermetic seal against the immersion medium, said combined specimen and lens-holding chamber being arranged for separation into a hermetically sealed lens-holding chamber and a hermetically sealed specimen chamber, so that inside the combined specimen and lens-holding chamber, the selected lens is positioned in the detection beam path, and after being hermetically separated, the lens-holding chamber and the specimen chamber can be emptied independently of each other.

9. The objective replacement device of claim 8 further comprising a separating wall hermetically separating said lens-holding chamber and said specimen chamber, that can be inserted into a linear motion guide.

10. An objective replacement device for a microscope, comprising:

a specimen chamber having a specimen located therein surrounded by an immersion medium inside the specimen chamber, said specimen being arranged so as to be positioned and oriented relative to a lens focus, light from said specimen creating a detection beam, the detection beam path being parallel to an optical axis of an objective lens, said path being perpendicular to gravity, a system for exchanging said lens for at least one other selected lens while keeping the specimen within the specimen chamber that is filled with the immersion medium in an unchanged position and orientation, and wherein a specimen chamber wall made of a transparent material or a material with a small hole is provided, said lens-side first optically active surface of a selected lens being positioned on the outer surface of said specimen chamber wall, facing away from the immersion medium, whereby after positioning, the detection light coming from the specimen reaches the selected lens by passing exclusively through the gel, the immersion medium and the transparent specimen chamber wall, or through the small hole.

11. The objective replacement device of claim 10, wherein the specimen chamber wall is made of a material that is both transparent and elastic so that the selected lens that is positioned on the specimen chamber wall can be moved along the direction of the detection beam path toward the specimen or away from the specimen while maintaining contact between the first optically active surface and the specimen chamber wall.

12. The objective replacement device of claim 10, wherein the specimen chamber wall is made of PTFE.

13. The objective replacement device of claim 10, wherein the specimen chamber wall, which is made of a transparent material, itself constitutes an optical element with an effect that influences the detection beam path.

* * * * *